United States Patent [19]

Swanson et al.

[11] 4,306,734
[45] Dec. 22, 1981

[54] APPARATUS FOR USE WITH A TRAILER EQUIPPED WITH A SURGE BRAKE ACTUATOR AND WITH AN ANTI-SWAY MECHANISM

[75] Inventors: James P. Swanson, Winnebago; Larry C. Huetsch, Rockford, both of Ill.

[73] Assignee: Atwood Vacuum Machine Company, Rockford, Ill.

[21] Appl. No.: 53,703

[22] Filed: Jun. 29, 1979

[51] Int. Cl.³ .............................................. B60D 1/16
[52] U.S. Cl. ............................ 280/446 B; 188/112 A
[58] Field of Search ............... 280/446 R, 446 B, 441, 280/483–487; 188/112 R, 112 A

[56] References Cited

U.S. PATENT DOCUMENTS

| | | | |
|---|---|---|---|
| 3,273,911 | 9/1966 | Waldie | 280/446 B |
| 3,502,351 | 3/1970 | Gray | 280/446 B |
| 3,779,582 | 12/1973 | Hedgepeth | 280/446 B |
| 3,787,077 | 1/1974 | Sanders | 280/446 B |
| 3,814,463 | 6/1974 | Tunesi | 280/446 B X |
| 3,948,544 | 4/1976 | Presley | 280/446 B |
| 4,015,856 | 4/1977 | Smith | 280/446 B |
| 4,037,856 | 7/1977 | Medlin et al. | 280/446 B |
| 4,165,885 | 8/1979 | Good et al. | 280/446 B |

OTHER PUBLICATIONS

Valley Tow-Rite Installation Instructions for Model 7569 Sway Control.
Eaz-Lift Regarding Eaz-Lift Sway Control Sections 9, 10, 11 and 12.
Reese Installation Instructions for Friction Sway Control 26600.

Primary Examiner—Joseph F. Peters, Jr.
Assistant Examiner—Randall A. Schrecengost
Attorney, Agent, or Firm—Leydig, Voit, Osann, Mayer & Holt, Ltd.

[57] ABSTRACT

A pivoted linkage is associated with an anti-sway mechanism in such a manner as to enable the mechanism to retard lateral sway of a trailer while preventing the mechanism from restricting forward surging of the trailer. As a result of the linkage, the anti-sway mechanism does not interfere with the operation of a surge brake actuator having pivotally interconnected front and rear units.

6 Claims, 6 Drawing Figures

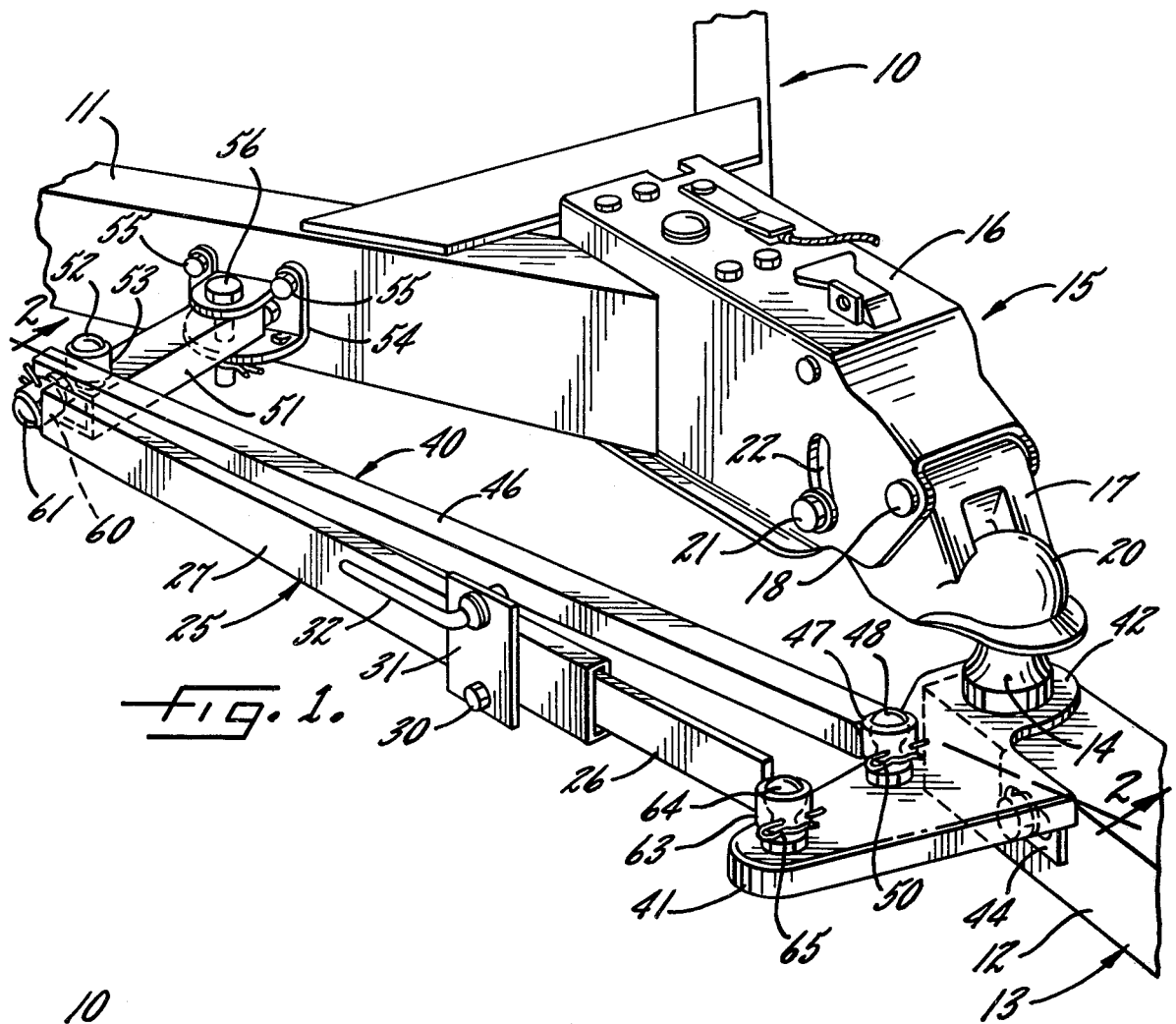
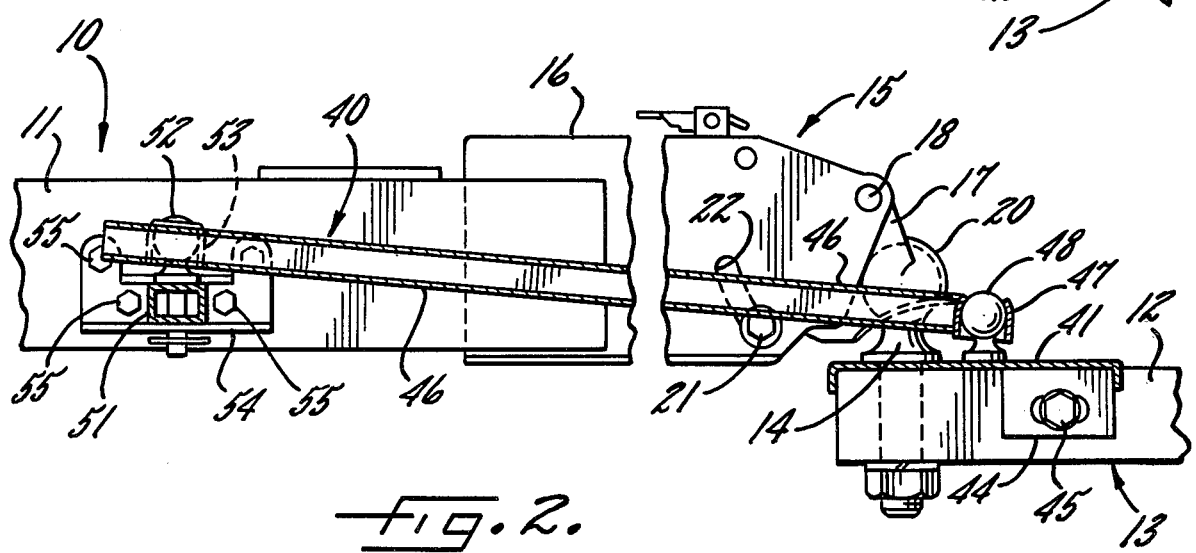

4,306,734

APPARATUS FOR USE WITH A TRAILER EQUIPPED WITH A SURGE BRAKE ACTUATOR AND WITH AN ANTI-SWAY MECHANISM

BACKGROUND OF THE INVENTION

It has long been recognized that it is desirable to restrict uncontrolled lateral swaying between a towing vehicle and an articulated trailer. Several anti-sway mechanisms have been developed for this purpose. One such mechanism is disclosed in Sanders U.S. Pat. No. 3,787,077 and operates on a principle which is similar to that of many commercially available anti-sway mechanisms. In the Sanders anti-sway mechanism, a front member is connected at its forward end to the towing vehicle to pivot about an axis which is offset laterally from the hitch axis. The front member is telescoped frictionally with a rear member which is pivotally connected to the trailer. When the trailer tends to sway, a frictional retarding force is created between the two telescoped members and serves to restrict the swaying motion.

Difficulty has been encountered in using anti-sway mechanisms with trailers which are equipped with certain types of surge brake actuators such as, for example, the actuator disclosed in Huetsch et al U.S. Pat. No. 4,223,766 entitled Trailer Hitch and Brake Actuating Assembly. That actuator includes a front unit which is pivotally connected to the hitch ball on the towing vehicle and which is movably interconnected with a rear unit adapted to be carried on the trailer. When the trailer surges forwardly, the rear unit moves forwardly relative to the front unit and causes the actuator to automatically apply the trailer brakes.

If a conventional anti-sway mechanism is used with a trailer which is equipped with a surge brake actuator, the anti-sway mechanism renders the brake actuator virtually inoperable. That is to say, the same frictional force which is created by the anti-sway mechanism to restrict sway also acts to retard forward surging of the trailer. Thus, the rear unit of the actuator is prevented from moving forwardly in normal fashion relative to the front unit and hence the trailer brakes cannot be applied under normal surge conditions.

The problem of using an anti-sway mechanism with a surge brake actuator has been recognized. In order to overcome this problem, some manufacturers of anti-sway mechanisms have provided mounting adaptors which enable the anti-sway mechanism to be used without impairing the action of the brake actuator. Such adaptors, however, can be used only with certain types of actuators and are entirely unsuitable for use with actuators of the type disclosed in the aforementioned Huetsch et al patent.

SUMMARY OF THE INVENTION

The general aim of the present invention is to provide new and improved apparatus which enables an anti-sway mechanism to be used effectively with trailers equipped with different types of surge brake actuators and particularly but not exclusively with actuators in which the front and rear units are pivotally interconnected with one another.

A related object is to provide apparatus which enables different types and models of anti-sway mechanisms to be used with a surge brake actuator without impairing the braking ability of the actuator.

A more detailed object is to achieve the foregoing by providing apparatus in which the anti-sway mechanism is connected to a unique pivoted linkage which enables the anti-sway mechanism to act in normal fashion when the trailer sways relative to the towing vehicle but which does not impair the action of the trailer surging forwardly relative to the towing vehicle.

These and other objects and advantages of the invention will become more apparent from the following detailed description when taken in conjunction with the accompanying drawings.

BRIEF DESCRIPTION OF THE DRAWINGS

FIG. 1 is a fragmentary perspective view of a trailer equipped with a surge brake actuator, with an anti-sway mechanism and with apparatus incorporating the unique features of the present invention.

FIG. 2 is a fragmentary cross-section taken substantially along the line 2—2 of FIG. 1.

DETAILED DESCRIPTION OF THE PREFERRED EMBODIMENTS

Figure 3:
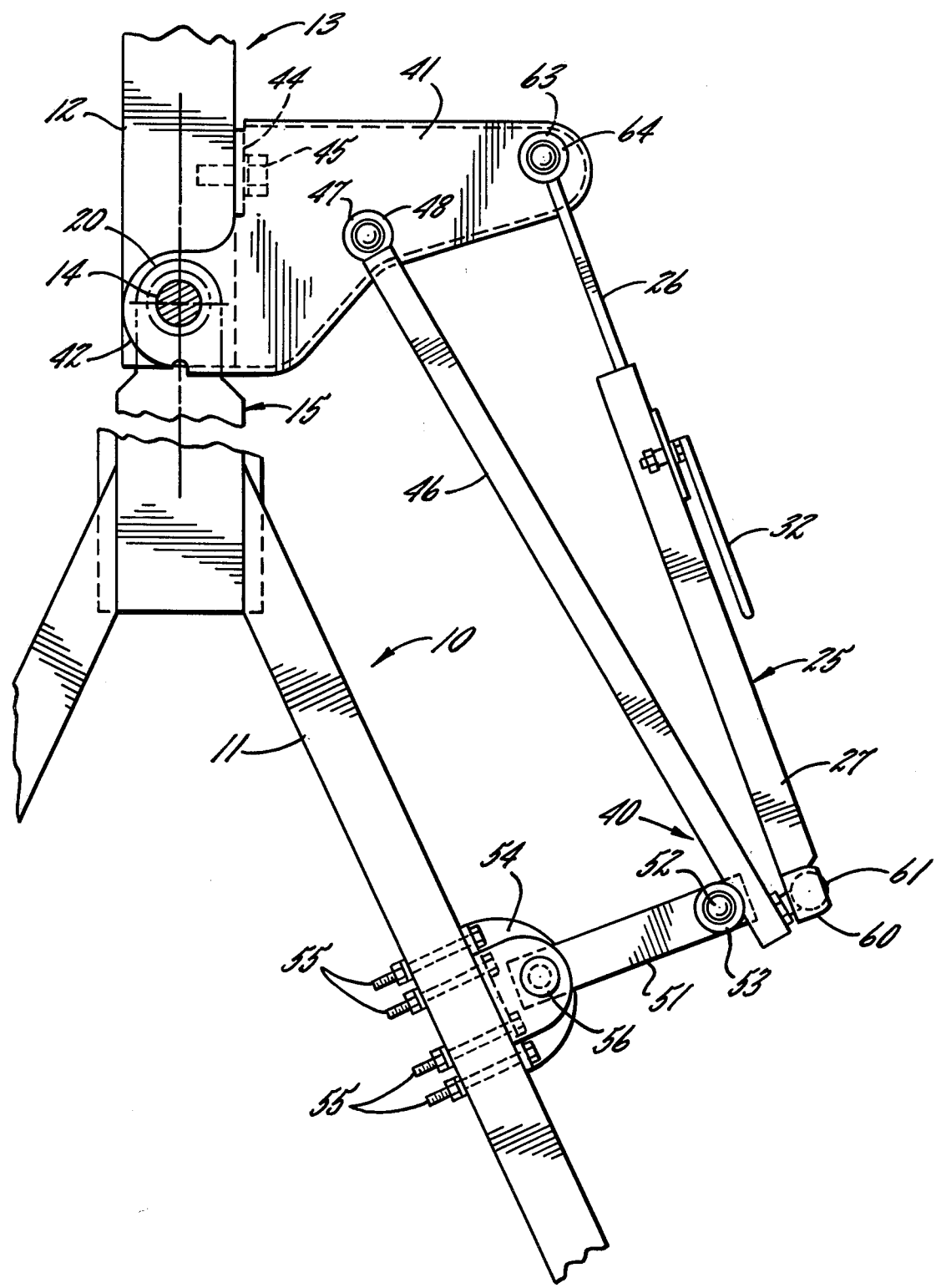
FIG. 3 is an enlarged fragmentary plan view of the apparatus illustrated in FIG. 1 and shows the parts in normal towing position.
Figure 4:
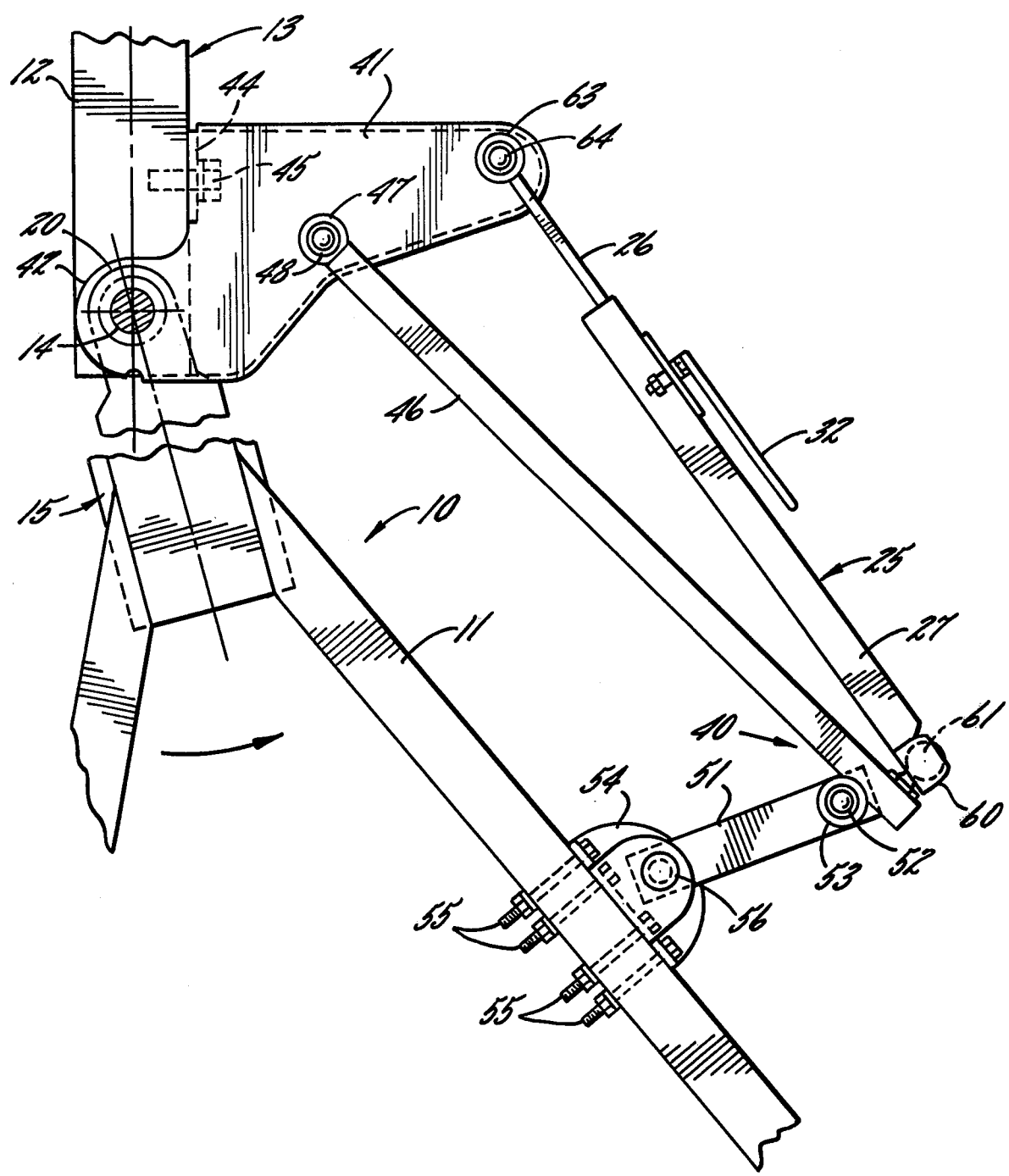
FIG. 4 is a plan view similar to FIG. 3 but shows the parts as positioned when sway occurs.

For purposes of illustration, the invention is shown in the drawings in connection with a trailer 10 having an A-frame tongue 11 adapted to be hitched removably to the draw bar 12 of a towing vehicle 13. The draw bar carries a conventional hitch ball 14 by which the trailer is coupled to the towing vehicle.

In the present instance, the trailer 10 is equipped with a surge brake actuator 15 which is of the same general type as disclosed in the aforementioned Huetsch et al patent. In general, such an actuator includes a rear unit 16 which is connected rigidly to the tongue 11 of the trailer. A front unit 17 is pivotally connected to the rear unit by a horizontal and laterally extending pivot pin 18 and includes a socket 20 which releasably receives the hitch ball 14. When the trailer surges forwardly and overruns the towing vehicle 13 as a result of the towing vehicle traveling slower than the trailer, the rear unit 16 moves forwardly and acts through the pivot pin 18 to cause the forward unit 17 to rotate clockwise (FIG. 1) or forwardly about the hitch ball 14. At the same time, the forward unit 17 pivots clockwise relative to the rear unit 16 about the pivot pin 18 so as to cause a laterally extending shoulder bolt 21 to travel upwardly and rearwardly within arcuate slots 22 in the rear unit. The shoulder bolt is connected to the front unit 17 and its upward and rearward movement is utilized to actuate a master cylinder (not shown) in the rear unit and apply the hydraulic brakes of the trailer 11.

The details per se of the surge brake actuator 15 do not form part of the present invention and thus a more specific disclosure of the actuator is not deemed necessary. Reference may be had to the Huetsch et al patent for a more detailed disclosure of the construction and operation of the actuator. Also, surge brake actuators having pivotally interconnected front and rear units are disclosed in Wagner U.S. Pat. No. 2,341,965; Mullin U.S. Pat. No. 2,729,309 and McDaniel, Sr. U.S. Pat. No. 2,956,648.

An anti-sway mechanism 25 is connected between the trailer 10 and the towing vehicle 13 in order to retard lateral sway between the trailer and the towing vehicle. The anti-sway mechanism allows the socket 20 to turn on the hitch ball 14 when the towing vehicle is intentionally turned but such mechanism creates a force which retards turning of the socket so as to reduce sway caused from passing trucks and sudden wind gusts.

The specific anti-sway mechanism 25 which has been illustrated in FIGS. 1 to 5 is a mechanism which is made and sold by Eaz-Lift Spring Corp. of Sun Valley, Calif. Briefly, such a mechanism includes a front member or bar 26 which is pivotally connected at its forward end to the towing vehicle 13 and which is telescoped into a rear member or tube 27. The rear end portion of the tube 27 is connected to the trailer 10. Pads (not shown) of brake lining are disposed within the tube 27 and frictionally engage the bar 26. The pressure between the pads and the bar may be adjusted by turning a control screw 30 (FIG. 1) which extends through a plate 31 on the outer side of the tube. Also, a handle 32 on the plate may be turned to completely release the pressure between the pads and the bar when road conditions do not require use of the anti-sway mechanism.

When the anti-sway mechanism 25 is operable, swaying of the trailer 10 in a counterclockwise direction (FIG. 4) causes the tube 27 to slide forwardly relative to the bar 26. During such sliding, the pads frictionally engage the bar and thus resist turning of the trailer so that the trailer does not sway uncontrollably. When the trailer turns in a clockwise direction, the tube is retracted rearwardly along the bar and the friction pads again engage the bar to retard the swaying motion.

A force of approximately 2500 pounds is required to cause the tube 27 of the anti-sway mechanism 25 to slide relative to the bar 26. The brake actuator 15, however, must be able to actuate trailer brakes in response to a much lower force (e.g., 100 pounds) when the trailer 10 overruns the towing vehicle 13. When the anti-sway mechanism is connected between the trailer and the towing vehicle in a conventional manner, the anti-sway mechanism not only retards sway but also retards forward movement of the trailer relative to the towing vehicle. As a result, the required pivotal movement of the rear and front units 16 and 17 of the actuator will not take place at forces under approximately 2500 pounds and thus the desired braking action will not be effected.

In accordance with the present invention, the anti-sway mechanism 25 is mounted in a novel manner by a unique pivoted linkage 40 which enables the anti-sway mechanism to retard swaying of the trailer 10 in a normal manner and which, at the same time, enables the trailer to surge forwardly without such surging being restricted to any significant degree by the anti-sway mechanism. By virtue of the linkage 40, the rear and front units 16 and 17 of the brake actuator 15 can pivot during surging of the trailer and can effect normal application of the trailer brakes without interference from the anti-sway mechanism. The latter, however, still is effective to restrict sway between the trailer and the towing vehicle 13.

More specifically, the linkage 40 is supported in part by a mounting plate 41 which is connected to the draw bar 12 of the towing vehicle 13. As shown in FIG. 1, the mounting plate extends laterally from the draw bar and includes an apertured ear 42 which is clamped against the upper side of the draw bar by the hitch ball 14. The mounting plate also includes a depending flange 44 (FIG. 2) which is secured to one side of the draw bar by a screw 45. Alternatively, the mounting plate 41 could be welded to the draw bar.

The linkage 40 includes an elongated rigid bar 46 whose forward end carries a socket-like collar 47 which receives a ball 48 attached to and projecting upwardly from the mounting plate 41. The collar is capable of pivoting with universal movement on the ball and is retained releasably thereon by a spring clip 50. The ball 48 is spaced laterally outwardly from the hitch ball 14 and is located slightly forwardly of the hitch ball (see FIG. 3).

As shown in FIGS. 1 and 3, the linkage 40 further includes a laterally extending link 51. The outboard end of the link 51 supports an upwardly projecting ball 52 which pivotally receives a socket-like collar 53 on the rear end portion of the bar 46. Thus, the bar 46 is capable of turning relative to the link 51 about an upright axis and is capable of substantially universal pivoting on the link.

The inboard end portion of the link 51 is received between the upper and lower ears of a substantially U-shaped mounting bracket 54 which herein is secured to the tongue 11 of the trailer 10 by bolts 55, although the bracket could be welded to the tongue. A vertical pin 56 extends through the ears and the inboard end portion of the link 51 and pivotally attaches the link to the bracket 54.

In carrying out the invention, the rear end portion of the anti-sway mechanism 25 is pivotally attached to the rear end portion of the bar 46 of the linkage 40. Thus, as shown in FIGS. 1 and 3, a socket-like collar 60 is attached rigidly to the rear end portion of the tube 27 and receives a ball 61 with substantially universal pivotal movement. The ball is attached to and projects laterally from the outboard side of the rear end portion of the bar 46.

The forward end portion of the anti-sway mechanism 25 is connected pivotally to the mounting plate 41. For this purpose, a socket-like collar 63 (FIG. 1) on the forward end portion of the bar 26 is coupled pivotally to a ball 64 projecting upwardly from the mounting plate 41, the socket being held releasably on the ball by a spring clip 65. The ball 64 is spaced laterally outwardly from the ball 48 and is located forwardly of the latter ball (see FIG. 3).

When the trailer 10 is being towed in a straight line and is not surging forwardly relative to the towing vehicle 13, the various parts are located substantially in the positions shown in FIG. 3. If the trailer sways in a counterclockwise direction (see FIG.4 ), the link 51 pivots about the ball 52 and the pin 56 and causes the rigid bar 46 to pivot counterclockwise about the ball 48. As the bar so pivots, its rear end portion causes the rear end portion of the tube 27 to move counterclockwise along an arc whose center is located at the ball 48. In order for the tube to move along such arc, it is necessary for the tube to slide forwardly along the bar 26 and thus a frictional retarding force is created between the tube and the bar 26 as the tube moves forwardly and as the bar 26 pivots on the ball 64. Accordingly, the bar 26 and the tube 27 coact to restrict counterclockwise swaying of the trailer 10. If the trailer sways in the opposite direction, the link 51 pivots reversely on the ball 52 and the pin 56 and causes the bar 46 to pivot clockwise around the ball 48. Such pivoting causes the rear end of the tube 27 to move clockwise around the aforementioned arc and thus the tube is retracted rearwardly along the bar 26 to create a frictional force restricting clockwise swaying of the trailer 10.

Figure 5:
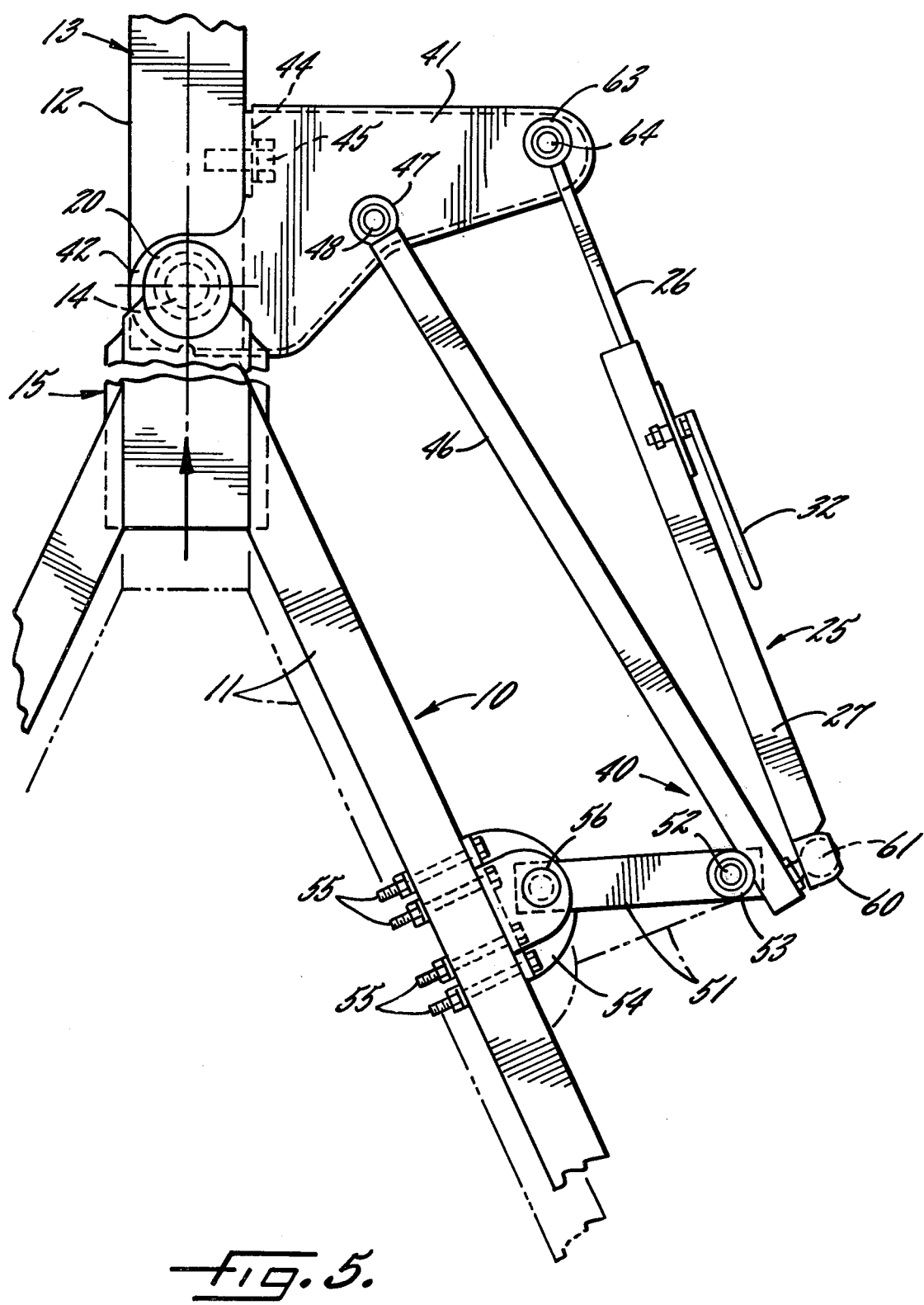
FIG. 5 also is a plan view similar to FIG. 3 but shows the parts as positioned when the trailer surges forwardly.

When the trailer 10 surges forwardly from the position shown in broken lines to the position shown in full lines in FIG. 5, the pin 56 moves forwardly and causes the link 51 to pivot about the ball 52. Because of such pivoting, the rear end portion of the bar 46 remains substantially stationary relative to the mounting plate 41. Thus, the tube 27 also remains stationary and does not move along the bar 26 to apply a frictional retarding force. Accordingly, the trailer 10 is free to surge forwardly without interference from the anti-sway mechanism 25 and thus the rear and front units 16 and 17 of the actuator 15 may pivot relative to one another to apply the trailer brakes.

From the foregoing, it will be apparent that the link 51 of the linkage 40 causes the rigid bar 46 to pivot about the ball 48 in response to swaying of the trailer 10 and that such pivoting results in relative movement between the bar 26 and the tube 27 of the anti-sway mechanism 25 so as to retard the swaying motion. When the trailer surges forwardly, however, the link 51 simply pivots on the ball 52 without changing the position of the bar 46 and without bringing the anti-sway mechanism into effect. Thus, the linkage 40 effectively isolates the anti-sway mechanism from the surge brake actuator 15.

Figure 6:
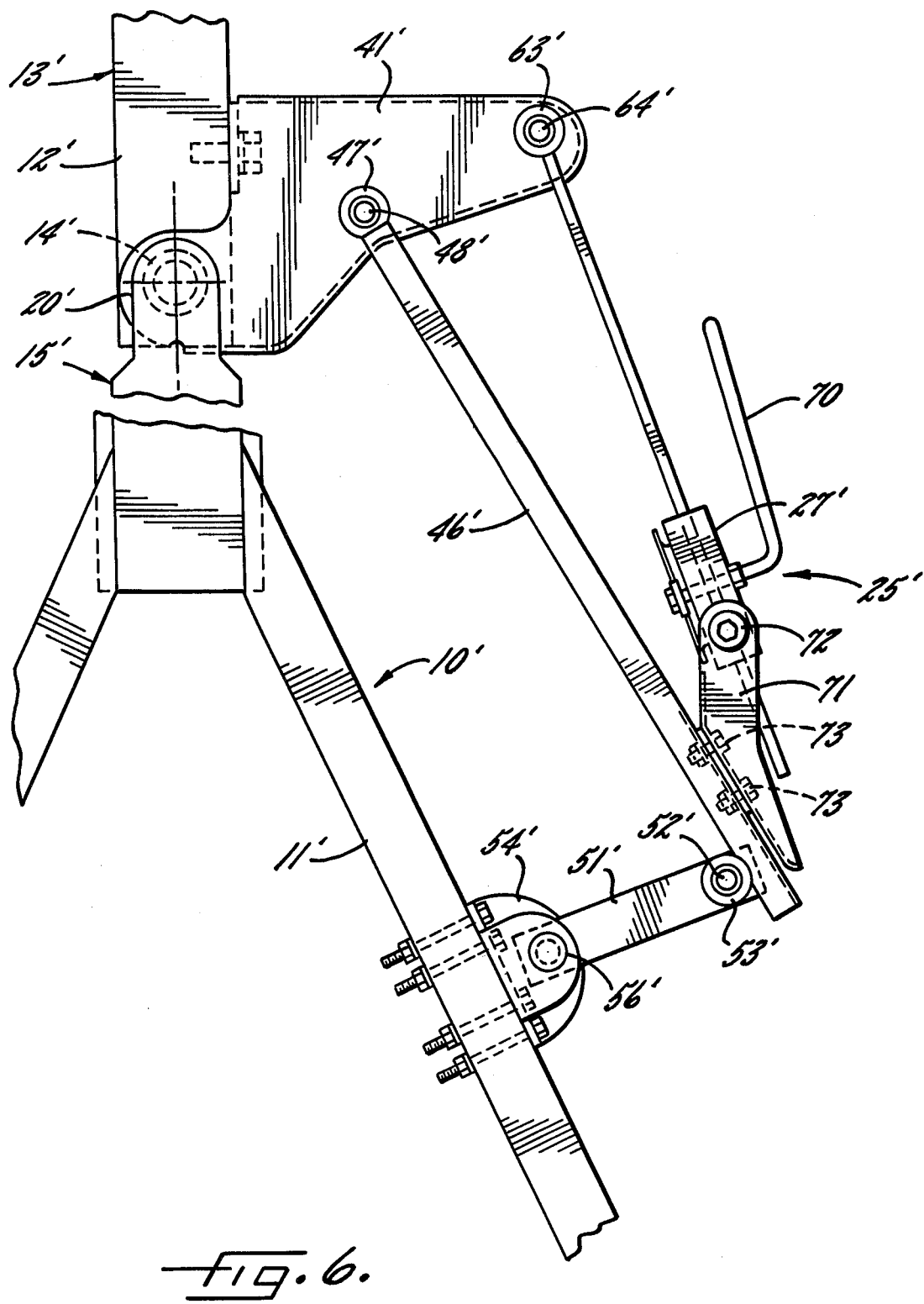
FIG. 6 is a plan view similar to FIG. 3 but shows an alternate embodiment incorporating the features of the invention.

Another embodiment of the invention is shown in FIG. 6 in which parts corresponding to those of the first embodiment are indicated by the same but primed reference numerals. The second embodiment is the same as the first except that the anti-sway mechanism 25' which is employed is a mechanism made by Reese Products of Elkhart, Ind., a division of Masco Corporation of Indiana. The Reese anti-sway mechanism is similar to the Eaz-Lift mechanism in that the Reese mechanism includes a forward bar 26' which is pivotally connected to the mounting plate 41' by a ball 64'. The bar 26' is telescoped slidably into a relatively short tube 27' which is equipped with friction pads (not shown) for engaging the bar. A handle 70 is associated with the tube for adjusting the pressure which the pads exert against the bar.

The anti-sway mechanism 25' further includes a mounting bracket 71 which supports a trunnion bolt 72. The trunnion bolt 72 extends through a portion of the tube 27' and mounts the tube for pivoting about an upright axis on the bracket 71.

Because the tube 27' is capable of pivoting on the trunnion bolt 72, the mounting bracket 71 is attached rigidly to the rear end portion of the bar 46'. In the present instance, such attachment is effected by bolts 73.

The apparatus of the second embodiment operates in virtually the same manner as the apparatus in the first embodiment. When the trailer 10' sways and the bar 46' pivots about the ball 48', the tube 27' pivots on the trunnion bolt 72 to accommodate pivoting of the bar 46' and to allow the tube to move relative to the bar 26'. When the trailer surges forwardly, the link 51' pivots about the ball 52' to allow the bar 46' to remain virtually stationary relative to the mounting plate 41'.

We claim:

1. An anti-sway mechanism for restricting an articulated trailer from swaying laterally relative to a towing vehicle, said anti-sway mechanism including a first member, means for attaching said first member to the towing vehicle, a second member connected to said first member for movement relative to the first member when sway occurs and coacting with the first member to restrict such sway, a rigid bar having front and rear end portions, means for attaching the rear end portion of said bar to said second member, means on the forward end portion of said bar for connecting the bar to the towing vehicle for pivotal movement about a first upright axis spaced from the articulation axis of the trailer, a link, and means on the end portions of said link for connecting one end portion of the link to the rear end portion of said bar for pivotal movement about a second upright axis and for connecting the other end portion of the link to the trailer for pivotal movement about a third upright axis.

2. An anti-sway mechanism as defined in claim 1 further including a plate adapted for attachment to the towing vehicle, the forward end portion of said first member and the forward end portion of said bar being pivotally attached to said plate.

3. An anti-sway mechanism as defined in claim 2 in which the forward end portion of said bar is attached to said plate at a point spaced forwardly and outboard of the articulation axis of the trailer, the forward end portion of said first member being attached to said plate at a point spaced forwardly and outboard of the attachment point of the forward end portion of said bar.

4. A vehicle system having a towing vehicle and an articulated trailer with brakes, having a surge brake actuator and having an anti-sway mechanism, said actuator having a front unit hitched to the towing vehicle to turn about a first upright axis, said actuator having a rear unit connected to the trailer and connected to said front unit to move forwardly and rearwardly relative to said front unit, said actuator causing the brakes of the trailer to be applied when said rear unit moves forwardly relative to said front unit, said anti-sway mechanism comprising first and second members connected together for relative movement and operable when moved relative to one another to restrict turning of the trailer about said first upright axis, said first member having a forward end portion connected to said towing vehicle to turn about a second upright axis, the improvement in said system comprising, apparatus for preventing said anti-sway mechanism from interfering with forward movement of said rear unit of said actuator relative to the front unit thereof, said apparatus including an elongated rigid bar attached to said second member of said anti-sway mechanism, means on the forward end portion of said bar for connecting the bar to the towing vehicle for pivotal movement about a third upright axis, a link, and means on the end portions of said link for connecting one end portion of the link to the rear end portion of said bar for pivotal movement about a fourth upright axis and for connecting the other end portion of the link to the trailer for pivotal movement about a fifth upright axis.

5. A vehicle system as defined in claim 4 further including means for attaching said second member of said anti-sway mechanism to said bar for pivotal movement about a sixth upright axis.

6. A vehicle system having a towing vehicle and an articulated trailer with brakes, having a surge brake actuator and having an anti-sway mechanism, said actuator having a front unit hitched to the towing vehicle to turn about a first upright axis and to rock forwardly and rearwardly relative to the towing vehicle, said actuator having a rear unit connected to the trailer and pivotally interconnected with said front unit to pivot forwardly and rearwardly relative to the front unit, said actuator causing the brakes of the trailer to be applied when said rear unit moves forwardly relative to said front unit, said anti-sway mechanism comprising first and second members telescoped slidably together and operable when slid relative to one another to restrict turning of the trailer about said first upright axis, said first member having a forward end portion connected to said towing vehicle to turn about a second upright axis, the improvement in said system comprising, apparatus for preventing said anti-sway mechanism from interfering with forward movement of said rear unit of said actuator relative to the front unit thereof, said apparatus including an elongated rigid bar, means on the forward end portion of said bar for connecting the bar to the towing vehicle for pivotal movement about a third upright axis, a link, means on the end portions of said link for connecting one end portion of the link to the rear end portion of said bar for pivotal movement about a fourth upright axis and for connecting the other end portion of the link to the trailer for pivotal movement about a fifth upright axis, and means for attaching the rear end portion of said bar to the rear end portion of said second member of said anti-sway mechanism for pivotal movement about a sixth upright axis.

* * * * *